United States Patent [19]
Laughlin et al.

[11] Patent Number: 5,533,696
[45] Date of Patent: Jul. 9, 1996

[54] CONDUIT CLIP

[75] Inventors: Raymond S. Laughlin, Cuyahoga Falls; Kenneth A. Golonka, Sr., Richmond Heights, both of Ohio

[73] Assignee: Erico International Corp., Solon, Ohio

[21] Appl. No.: 896,837

[22] Filed: Jun. 11, 1992

Related U.S. Application Data

[63] Continuation-in-part of Ser. No. 725,585, Jul. 3, 1991, abandoned.

[51] Int. Cl.$^6$ .................................................... F16C 3/08
[52] U.S. Cl. ............................. 248/74.2; 248/74.1
[58] Field of Search ..................... 248/74.1, 74.2, 248/74.3, 68.1, 74.4; 24/543, 20 EE, 23 EG

[56] References Cited

U.S. PATENT DOCUMENTS

| | | | |
|---|---|---|---|
| 325,672 | 9/1885 | Gray . | |
| 3,143,325 | 8/1964 | Carpenter et al. | 248/68 |
| 3,198,463 | 8/1965 | Loudon | 248/62 |
| 3,210,815 | 10/1965 | Breuning | 24/20 EE |
| 3,323,766 | 12/1965 | Schauster | 248/62 |
| 3,501,117 | 8/1970 | Soltysik | 248/71 |
| 3,739,435 | 6/1973 | Baker | 24/257 |
| 4,101,103 | 7/1978 | Monney et al. | 248/305 |
| 4,360,178 | 11/1982 | Senter et al. | 248/74 |
| 4,674,720 | 6/1987 | Fetsch | 248/74 |
| 4,713,863 | 12/1987 | Jennings | 24/20 |
| 4,783,029 | 11/1988 | Geppert et al. | 248/74 |
| 4,958,792 | 9/1990 | Rinderer | 248/74 |
| 4,958,797 | 9/1990 | Rinderer | 248/74.2 |

FOREIGN PATENT DOCUMENTS

| | | | |
|---|---|---|---|
| 2591709 | 6/1987 | France | 248/74.1 |
| 2838 | 9/1868 | United Kingdom | 24/20 EE |

OTHER PUBLICATIONS

Caddy Newsletter, Erico Products, Inc., 1981.
Suspension Fasteners for the Construction Industry Thomas Industries, 1983.

*Primary Examiner*—Alvin C. Chin-Shue
*Attorney, Agent, or Firm*—Renner, Otto, Boisselle & Sklar

[57] ABSTRACT

A conduit support clamp comprising a U-shaped body having resilient legs. Each leg terminates in a foot section extending toward the other leg, one foot overlapping the other foot. The clamp includes a low profile latch to connect the foot sections. The latch includes a catch having compound angles whereby the overlapping foot sections present a substantially smooth outer surface and in which neither foot section extends beyond the opposing leg whereby the clamp may be manually latched.

14 Claims, 2 Drawing Sheets

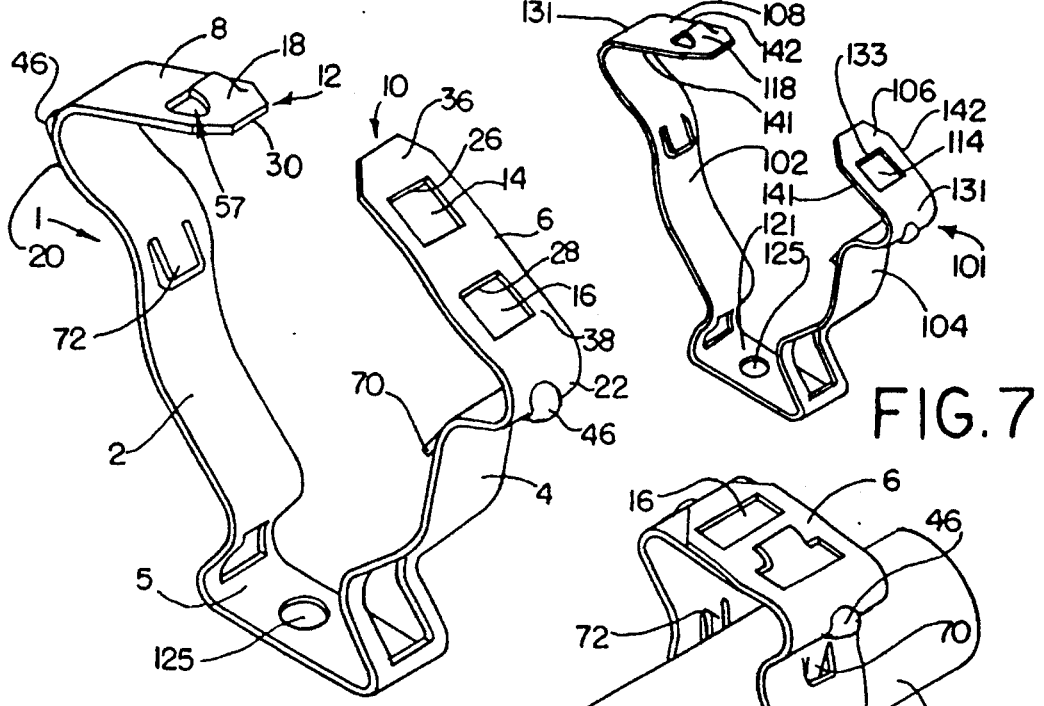
FIG. 1 FIG. 7
FIG. 2
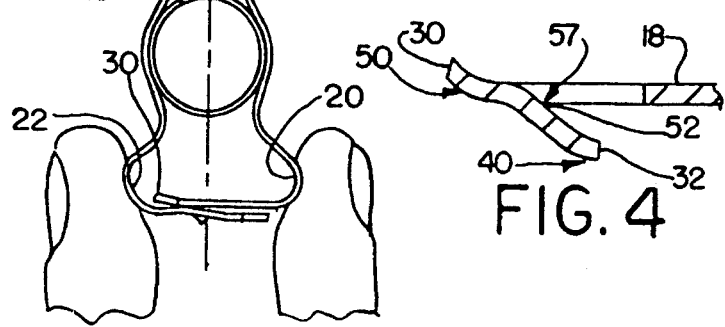
FIG. 3 FIG. 4 FIG. 6
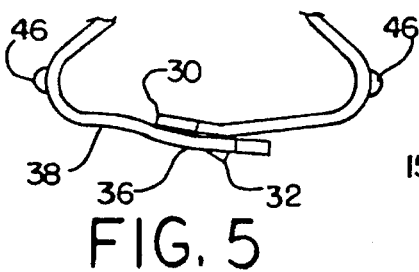
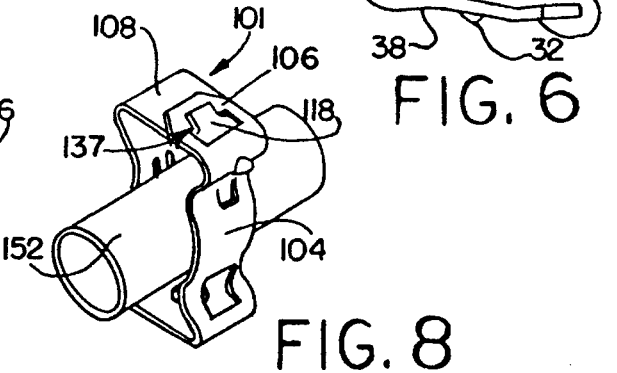
FIG. 5 FIG. 8

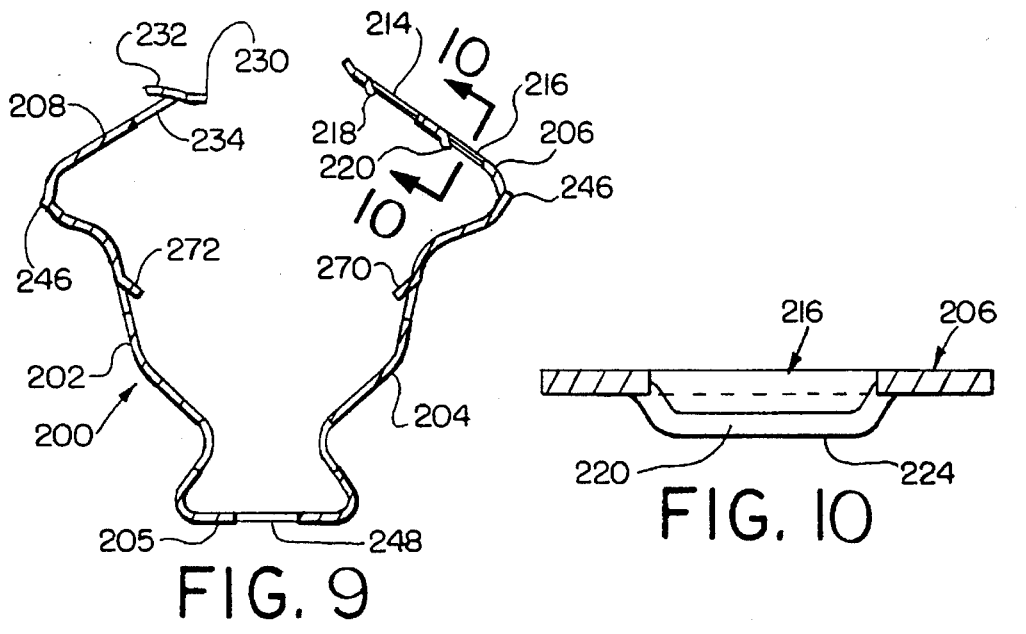
FIG. 9
FIG. 10
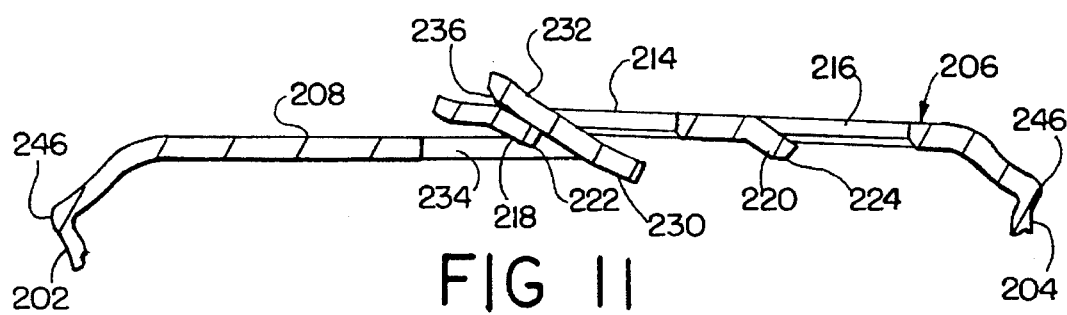
FIG 11
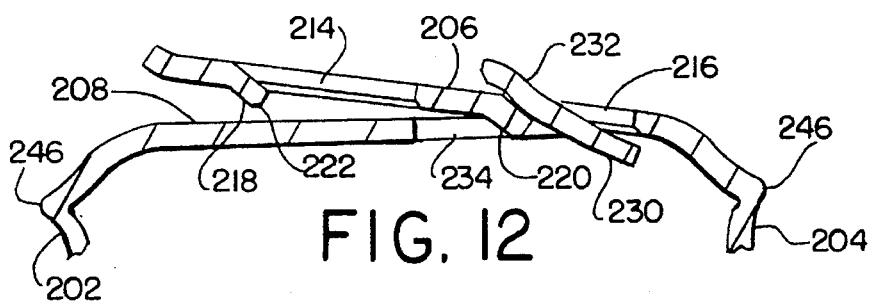
FIG. 12
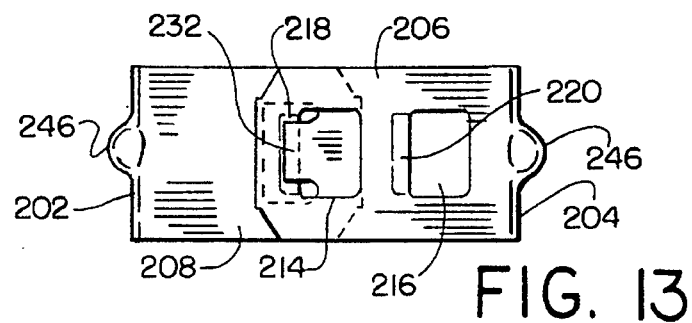
FIG. 13

CONDUIT CLIP

RELATED APPLICATION

This application is a continuation-in-part of applicants' application, Ser. No. 07/725,585, filed Jul. 3, 1991, abandoned, and entitled "Conduit Clip".

DISCLOSURE

This invention relates to conduit clips for supporting pipes, electrical conduit and the like.

BACKGROUND OF THE INVENTION

Conduit clips and, in particular, those used for the support of electrical conduit have long been used in the construction industry. As an example, the assignee of this application, Erico Products, Inc., manufactures and sells what is known in the trade as a Caddy® 8-12M conduit clip. The clip is formed from spring steel and is generally U-shaped in overall configuration. The clip has two spring legs adapted to engage differently sized conduit. The legs terminate in inner and outer foot sections extending toward and overlapping each other when the clip is closed. The inner foot section has a longitudinally bent locking tab which engages the apex of either of two longitudinally spaced triangular holes in the outer foot section depending on the diameter of the conduit being supported.

A conduit clip of similar description is also manufactured by Minerallac Electric Company. This clip includes a guide channel between two holes for channeling the locking tab between the first hole and the second hole to secure conduit of different diameters. The tab bends of both fasteners run longitudinally of the foot such that the bent tab extends in a plane longitudinally of the foot. A locking tab edge surface is thus formed on one foot for engaging the apex of the locking holes of the other foot.

A somewhat similar but more complex clip using two longitudinally bent tabs and paired sets of holes is sold by B-Line. Such complex clip is seen in U.S. Pat. No. 4,958,792. In all of the above fasteners, the tabs tend to form a burr in tension parallel to the grain of the steel creating a potential weak point. Moreover, the tabs project substantially beyond the clip and tend to catch on many things, such as workers' gloves, clothing, etc.

Also, such fasteners generally need to be closed with channel lock pliers and, in some cases, with at least two adjustments of the pliers. Such offset pliers require substantial clearance, limiting how close the fasteners may be positioned, and also causing a torsional twist which may make the fastener difficult to close.

Thomas Industries, Inc. has sold a locking conduit/pipe clip which also is generally U-shaped. It differs from the aforementioned clips in that a locking tab is employed which is bent inwardly from the outer locking foot on which it is carried. Further, the bend permitting the formation of the tab extends generally transversely of the clip such that a transversely extending tab is formed. The tab enters either of two locking openings on an inner locking foot and extends toward a pipe which is clamped within the clip. However, twisting or bending of the conduit may cause the fastener to open.

There is a need to provide a clip fastener which will close around conduits without either foot extending beyond the fastener legs when smaller conduits are being secured. There is a need to provide unobtrusive gripping points or dimples on a fastener leg to enable the clip to be closed easily by finger pressure or with slip-joint pliers.

There is also a need to eliminate sharp protrusions on the perimeter of a conduit clamp. It is further desirable that a locking tab be provided with improved locking strength. There is also a need to provide a clip which tends to center the conduit in the fastener and which additionally increases the strength of the fastener against opening due to loading.

SUMMARY OF THE INVENTION

With the foregoing in mind, it is a principal object of this invention to provide a conduit clip or clamp having a relatively smooth outer surface to minimize snagging, reduce the overall fastener profile, and provide a clamp that is aesthetically more pleasing than those that have existed previously. It is a further object of the invention to provide a conduit clamp having dimpled gripping surfaces which provide both a pliers pad and a surface that can be gripped by hand for closing the fastener without impaling the user.

It is a further object of this invention to provide a clip having interlocking feet which do not extend beyond the fastener legs when the clamp is closed. This would prevent manual closing of the clip. It is a further object of the invention to provide a fastener which can be closed from directly beyond the fastener latching mechanism as opposed to having to approach the fastener with pliers from the side at an angle. This substantially eliminates torsional loading and potential misalignment of the fastener during closure and permits closer spacing.

It is a further object of the invention to provide a clamp having a locking tab which avoids vertical misalignment, such tab having a compound angle camming surface which is easily moved between locking slots.

It is a further object of the invention to provide a locking tab which is struck such that the grain of the spring steel from which the clip is made is compressed across its length on the inside of bends formed by a stamping operation in contradistinction to a locking tab which is formed having a bend line parallel with the grain of the material from which it is formed.

These and other objects of the present invention may be achieved by providing a generally U-shaped spring metal conduit clamp having legs adapted to embrace different size conduit, each leg terminating in a foot section extending generally toward the other leg. One foot section has a plurality of generally rectangular holes spaced longitudinally of the foot, and the other foot section terminates in a deviating cam catch. The foot sections may be pressed toward each other by finger pressure applied at the heels of the feet to secure the catch in a selected one of the holes depending on the size of the conduit being clamped.

Each of the foot sections is of approximately the same length such that neither foot section extends beyond the heel of its mating foot section when the clamp embraces smaller sized conduit. The clamping holes include locking edges which extend transversely of the foot. The deviating cam catch includes a struck leading portion which extends below the plane of the foot, and the catch continues into a struck trailing portion which projects above the plane of the foot and which is adapted to lock with one of the transversely extending linear edges of either hole after the clamp has been placed around a conduit.

In one embodiment the transverse locking edge of the hole is struck or deviated inwardly to obtain an almost parallel overlap of the locking tab and transverse edge. In any of the embodiments, any tendency to open the legs or separate the foot sections simply increases the overlap. The clip or clamp can only be opened by significant and distinct movement of the legs or foot sections toward each other.

To the accomplishment of the foregoing and related ends, the invention, then, comprises the features hereinafter fully described and particularly pointed out in the claims. The following description and annexed drawings set forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a perspective view of a conduit clamp constructed in accordance with this invention;

FIG. 2 is a perspective view of a clamp locking about a conduit;

FIG. 3 is an end view of the conduit clamp locked about a conduit;

FIG. 4 is a fragmented side cross-sectional view of the locking tab;

FIG. 5 is a fragmentary end view of the conduit clamp locked in its first clamping position;

FIG. 6 is a fragmentary end view of the conduit clamp locked in its second clamping position;

FIG. 7 is a perspective view of a conduit clamp having one locking hole;

FIG. 8 is a perspective view of the locking clamp of FIG. 7 in position about a conduit;

FIG. 9 is a longitudinal section of a conduit clamp having somewhat modified locking edges in the locking holes;

FIG. 10 is an enlarged transverse section taken substantially on the line 10—10 of FIG. 9 illustrating the inwardly struck locking edge;

FIG. 11 is an enlarged fragmentary longitudinal section of the foot sections showing the tab and hole edge engaged for larger size conduit;

FIG. 12 is a view similar to FIG. 11 showing the foot sections engaged for smaller size conduit; and FIG. 13 is a view on a somewhat reduced scale from the top of FIG. 11.

DESCRIPTION OF THE PREFERRED EMBODIMENTS

Referring now in detail to the drawings, and initially to FIG. 2, one form of conduit clip in accordance with this invention is generally indicated by reference numeral 1. The clip is generally U-shaped and is formed of spring steel or metal.

The clamp comprises two resilient lateral support legs 2 and 4 which are adapted to embrace different sized electrical conduit or the like. Legs 2 and 4 extend from a clamp mounting base 5 and terminate in outer and inner foot sections 6 and 8, respectively. The foot sections extend generally toward each other in a predetermined spatial relationship between their leading edges 10 and 12, respectively. The spaced relationship is such that a pipe or conduit 13 (FIG. 2) which is to be clamped may be passed between leading edges 10 and 12 preparatory to securing the clamp about the conduit.

Foot section 6 is provided with and defines a pair of rectangular apertures 14 and 16 which are spaced longitudinally on the foot section 6. The inner foot section 8 terminates in a deviating cam catch 18. After a conduit is placed in the clamp, the foot and leg sections may be squeezed toward each other, as shown in FIG. 3, by pressure exerted on heel sections 20 and 22. When the pressure is released, catch 18 is captured and secured and locked in one of the multiplicity of holes 14 or 16 depending on the size of the conduit being clamped.

The clamp of this invention is closable by finger pressure, as is illustrated in FIG. 3, and to the accomplishment of this end, each of the elongate foot sections 6 and 8 are of approximately the same length so that one foot section does not project beyond the heel of the other foot section when the clamp is closed about a conduit of smaller or the smallest size. When the clamp is being closed for securing conduit of the smallest size, the leading edges 10 and 12 of the outer (6) and inner (8) feet linearly overlap each other at a distance which does not exceed the length of the inner foot 8. Thus, the leading edge 10 of the outer foot 6 does not extend beyond heel 20 of leg 2 and foot 8. This relationship permits the clamp to be squeezed shut by approaching the latching end head on.

Each of the locking holes is generally rectangular in shape and has linear edges 26 and 28 which extend transversely of the foot 6. The deviating cam catch includes a struck leading portion 30 (FIG. 4) at the end 12 of the foot 8. Portion 30 projects below (inwardly of) the plane of the foot and continues into a struck trailing portion 32 which projects above (outwardly of) the plane of the foot. The trailing portion is bent to be almost parallel to yet offset from the foot and is adapted to catch one of the transversely extending linear edges 26, 28 of the holes 14 or 16 when compressive pressure is released from the clamp after snapping it shut. The trailing portion 32 substantially parallel to the foot presents a low, smooth profile when the clamp catch is secured in either hole; thus, the smooth outer surface of the fixture minimizes snagging, reduces the fastener profile, and presents a more aesthetically pleasing fastener.

To further facilitate the presentation of a smooth overall outside surface and to assist in fastener closure, apertured foot 6 is bent in the shape of a flattened "S" or ogee curve (FIGS. 5 and 6) which presents two flattened plateaus 36, 38 which define apertures 14, 16, respectively. When the clamp is squeezed together around, for instance, a ¾" conduit, the inner foot 8 and plateau 36 of the apertured arm meet each other along substantially parallel planes. If it is desired to clamp ½" conduit, for instance, the flattened S-shaped configuration of the apertured foot allows the presentation of apertured plateau 38 on a substantially parallel plane to that being traversed by inner foot 8 as the clamp is squeezed together. Thus, the offset plateaus on the ogee curve shaped apertured foot accommodate a changed fulcrum around different outside diameter conduit to allow the apertured foot and the catch carrying foot to approach each other in substantially parallel planes. This provides positive locking and permits the deviation of trailing portion 32 of the locking tab to be kept at a minimum.

Trailing portion 32 of locking tab 18 is bent at its terminal end 40 to extend substantially parallel to the foot, thus providing a low profile when the clamp catch is secured in either hole.

The clamp is designed to be closed by either finger pressure or by use of commonly available slip-joint pliers. Its design eliminates the necessity of using channel lock pliers to close the clip. It has been found that channel lock pliers need more room and tend to twist fasteners, causing misalignment; thus, the elimination of the necessity of their use is advantageous.

The clamp has been provided with dimples 46 which have been pressed into the surface of the heels of the clamp. The dimples or plier pads 46 present a non-injurious surface which can be used either to hold a pair of pliers or enable the clamp to be closed by hand without impaling the user. The dimples do not reduce the sectional area of the clamp as a struck prong does; thereby, the clamp is inherently stronger. Furthermore, the dimples will not catch on or snag other items, and the part is easier to manufacture.

To assist in the improved closability of the clip, each foot of the clip is of substantially the same length although the outboard apertured foot 6 may be slightly shorter than the inner (conduit side) foot 8. This permits the fastener to be gripped directly from below as seen in FIG. 3 and eliminates the necessity of gripping the clip with channel lock pliers from an angle to avoid interfering with the latching mechanism itself as had been a problem previously. Since the fastener may be approached straight on and inward pressure exerted on the feet and legs, torsional loading is eliminated as is the potential misalignment of the fastener during closure. Additionally, closure of the fastener is effected easily without a great deal of care having to be taken to align the fastener. Also, due to the leg length of the instant invention, the edges or ends of the feet do not extend beyond the width of the part. Furthermore, a "break off" tab which is a nuisance is no longer needed for ½" conduit applications.

Turning now with more particularity to the locking tab feature, the tab's leading edge 12 is bent downwardly (toward the conduit) and slides smoothly under foot 6 as the feet are urged into registry with each other. The camming surface 50 in cooperation with catch receiving foot 6 prevents vertical misalignment during closure. The compound curved cam surface 50 also enables the tab to move easily between slots. The smooth tab profile in which the leading portion 30 is bent below the plane of the foot and the trailing portion 32 projects above the foot reduces the deflection required to clamp and lock the unit around a conduit. The compound angles on the tab assist the locking of the fastener in the closed position in a tab hole and, when closed, the tab extends on either side of the foot into which it is latched.

Generally, the width of the locking tab is sixty-percent of the width of the hole. In a typical application, this allows about a 1/16" deviation of the tab toward either side of the hole in which it is placed. The tab, being formed of a material of a certain thickness, is nonetheless greater in width than that thickness.

When manufacturing a clamp of the type described, spring steel is normally run through a slitter to produce strips of material of a width desired for the eventual end finish width of the clamp. Certain areas are stamped, struck as desired, sheared to a desired length, and then formed.

When spring steel is slit in the manner described, the grain of the steel runs longitudinally of the strip that is cut. When forming a tab as described for use in the instant application the tab is stamped such that the grain is compressed across its length on the inside of bends that are formed during the stamping process. The tab is thus stronger than it would be if a fold line were created, as is done in the prior art, parallel to the grain of the steel from which the part is made. Additionally, the tab of the instant invention is not only formed cross grain but is then essentially extruded upward which results in very little loss in overall cross section of the clamp in the area 57 of the clamp. The foot cross-section is solid from locking area 57 to the leading edge 30.

A wide contact area 52 between the tab and a desired hole edge resists relative rocking of the two parts which can occur, for instance, if a conduit is left dangling from a clip during installation. Because of the large contact surface area and the transverse bend, stress fractures are generally avoided, as are breaks at the bevel or bend of the tab. Furthermore, because of the transverse bend in the tab, the amount of steel running transverse of the strip from which the clip is made is not reduced to the extent that it is when a locking tab is bent on a line parallel with the grain of the steel from which the part is being manufactured.

The conduit clip of the invention is also provided with double locking tabs 70 and 72 for gripping a conduit placed in the clamp. The tabs located on each leg increase the holding strength of the fastener. The tabs serve to center the conduit in the fastener and increase the strength of the fastener against opening due to loading. Further, the double tab feature prevents the conduit from sliding when wires are pulled through the conduit.

Referring now with particularity to FIGS. 7 and 8, a generally horseshoe shaped conduit clamp 101 with but one aperture is illustrated. But for the number of holes in the feet, the two clamps are essentially the same.

The clamp of FIGS. 7 and 8 has opposed interlocking legs 102, 104 merging into opposed interlocking feet 106, 108. Foot 108 is provided with a detent or sloped transverse locking catch 118, and the other foot 106 defines a centrally disposed aperture 114 for releasably securing detent 118 and locking the clip.

Foot 106 has an opening having a transversely extending edge 133 for interlocking with the uplifted transversely extended fold line area 137 of catch 118. Edge 133 lies between sides 141 and 142 of foot 106.

When the clamp is closed, locking catch 118 extends in a direction from the conduit 152 outwardly; thus, if force is applied to the conduit tending to dislodge it from the fastener, the inwardly lying foot 108 will be pressed into the overlapping outboard foot 106 and tend to lock the fastener tighter. Detent means 118 has a width transverse of the clip extending between sides 141, 142 of foot 108. As with the two hole clip, this width is greater than the thickness of the material from which the clip is made.

The feet of the one hole clip have a length substantially equal to one another. The legs extend away from the feet and are joined by a clip attachment structure 121 which is remote from the feet. Connecting end 121 corresponds to support structure 5 of the two hole clip. Either of the clips circumscribe and support conduit and are suitably securable through aperture 125 to appropriate supporting structure.

Referring now to the embodiment of FIGS. 9–13 there is illustrated a slightly modified form of the two hole clip seen in FIGS. 1–6. The clip 200 includes spring legs 202 and 204 extending from base 205. The legs terminate in outer foot section 206 and inner foot section 208. It is noted that the outer foot section 206 is straight or planar and is provided with two generally square holes shown at 214 and 216. Each of the generally square holes has an inwardly struck or inwardly deviating leading edge such as seen at 218 and 220, respectively. The very inner edge of each struck edge may be coined as indicated at 222 and 224, respectively.

The inner foot section 208 terminates in an inwardly projecting tip portion 230 and an outwardly deviating rearwardly projecting cam catch 232 is struck from hole 234.

The compound curved cam catch is the only outward projection on either foot section and the underside of the trailing end is coined as indicated at 236.

FIG. 11 illustrates the clip locked together for larger size conduit with the trailing deviating cam catch overlying the inwardly struck hole edge 218. It is noted that in such position there is significant overlap and a twisting of the conduit or other force tending to separate the spring legs will simply enhance the overlap and thus the locking together of the legs and the conduit within the clip.

FIG. 12 illustrates the foot section with the deviating cam catch engaged in locking hole 216 and overlying the struck edge 220. It is noted that the foot section 206 does not project beyond the foot section 208 thus enabling the two positions seen in FIGS. 11 and 12 readily to be obtained by finger pressure. Such finger pressure is applied at the outwardly struck dimples or pads 246. A mounting hole is provided in the base 205 as indicated at 248 and inwardly struck tangs shown at 270 and 272 engage the outer wall of the conduit to prevent relative movement once the clip is locked in place.

In order to achieve the relative positions of the two overlying feet, the spring legs 202 and 204, although appearing to be symmetrical, are not. The radii of the reverse bends near the outer ends of the spring legs are somewhat larger for the righthand leg seen in FIG. 9 which supports the overlying foot section 206 with the rectangular locking holes.

It will be appreciated that the generally square locking holes with the deviated inwardly leading edge may be employed with a version of the clip utilizing only one locking hole in the overlying foot section, such one hole version being seen in FIGS. 7 and 8.

Although the invention has been shown and described with respect to certain preferred embodiments, it is obvious that equivalents, alterations and modifications will occur to others skilled in the art upon reading and understanding the specification. The present invention includes all such equivalent alterations and modifications, and is limited only by the scope of the claims.

What is claimed is:

1. A spring metal conduit clamp of a certain thickness for circumscribing and supporting conduit, said clamp comprising interlocking elongate feet each having longitudinal sides, said feet merging into resilient legs and being compressible toward each other, at least one of said feet having outwardly extending detent means for engaging the other of said feet in interlocking relationship; said detent means having a width extending transversely of the foot between the two sides, said width being greater than the thickness of the clamp, another of said feet including an aperture between the longitudinal sides accommodating said detent means as said feet are compressed toward each other and having a transverse linear edge for interlocking with the width of said detent means when said feet are released.

2. The clamp of claim 1 wherein one of said feet lies outwardly of the other when the feet are interlocked, said outwardly lying foot having a length substantially equal to or less than the length of the inwardly lying foot.

3. The clamp of claim 1 wherein said transverse edge is struck inwardly.

4. The clamp of claim 1 including two apertures in said another of said feet whereby said clamp will circumscribe and support conduit of different size.

5. The clamp of claim 1 wherein said detent means comprises a low profile catch having a transverse linear edge struck outwardly.

6. A spring metal conduit support clip comprising a generally U-shape body having conduit gripping spring legs terminating in inwardly directed opposed interlocking spring feet adapted to overlie each other when said legs are pressed toward each other to embrace and support a conduit therebetween, one of said spring feet having an outwardly offset transversely extending low profile catch, the other of said spring feet including a generally centrally disposed rectangular aperture adapted to accommodate said catch therethrough as said legs are pressed toward each other, said rectangular aperture having a transverse linear edge adapted to engage said catch throughout the transverse extent of said catch when said legs are released capturing said catch on said edge and locking said clip about the conduit, said other foot having a plurality of centrally disposed rectangular apertures as aforesaid whereby said clip is lockable in a multiplicity of locked positions for securing conduit of different sizes, and said feet have a length substantially equal to each other, whereby said legs may be manually pressed toward each other to secure said legs about the conduit by engaging the clip where the feet join the legs without interference from a projecting foot.

7. A spring metal conduit support clip comprising a generally U-shape body having conduit gripping spring legs terminating in inwardly directed opposed interlocking spring feet adapted to overlie each other when said legs are pressed toward each other to embrace and support a conduit therebetween, one of said spring feet having an outwardly offset transversely extending low profile catch, the other of said spring feet including a generally centrally disposed rectangular aperture adapted to accommodate said catch therethrough as said legs are pressed toward each other, said rectangular aperture having a transverse linear edge adapted to engage said catch throughout the transverse extent of said catch when said legs are released capturing said catch on said edge and locking said clip about the conduit, said other foot having a plurality of centrally disposed rectangular apertures as aforesaid whereby said clip is lockable in a multiplicity of locked positions for securing conduit of different sizes, and wherein said feet further comprise an outer foot and an inner foot, said feet having linearly overlapping leading edges, the amount of linear overlap not exceeding the length of the inner foot when the clamp is being closed for securing conduit of smallest size.

8. The clip of claim 7, said catch being located on the inner foot, said apertures being located on the outer foot and each having transversely extending linear locking edges.

9. A spring metal conduit support clip comprising a generally U-shape body having conduit gripping spring legs terminating in inwardly directed opposed interlocking spring feet adapted to overlie each other when said legs are pressed toward each other to embrace and support a conduit therebetween, one of said spring feet having an outwardly offset transversely extending low profile catch, the other of said spring feet including a generally centrally disposed rectangular aperture adapted to accommodate said catch therethrough as said legs are pressed toward each other, said rectangular aperture having a transverse linear edge adapted to engage said catch throughout the transverse extent of said catch when said legs are released capturing said catch on said edge and locking said clip about the conduit, said other of said feet overlying said one of said feet and being substantially planar and straight, and wherein said transverse linear edge of said aperture is struck inwardly of the plane of said other of said feet.

10. A spring metal conduit support clamp comprising a U-shaped body having resilient legs, each leg terminating in a generally planar foot section extending toward the other leg, one overlapping the other, and low profile latch means to latch the foot sections together, said latch means including a transverse curved catch on one of the feet whereby the overlapping foot sections present a substantially smooth outer surface, said catch extending above the plane of said one foot, said catch also including a leading portion extending below the plane of said one foot, the other of said feet including at least two holes each having latching edges extending transversely of the said other foot section, and wherein each latching edge is struck inwardly.

11. A generally U-shape spring metal conduit clamp comprising spring legs, said legs terminating in foot sections extending generally toward each other in a predetermined spatial relationship, one foot section having a hole therethrough with a transverse linear edge, and the other foot section lying inwardly thereof and terminating in a low profile deviating cam catch extending transversely of the foot, whereby said foot sections may be pressed toward each other by finger pressure at the heel of the foot to secure the catch in the hole against its linear transverse edge upon release of such finger pressure, said clamp being adapted to embrace different size conduit, there being a pair of holes spaced longitudinally of one foot section, each hole having linear edges extending transversely of the foot, the application and then release of finger pressure serving to secure the catch in a selected one of said holes depending on the size of the conduit clamped, and wherein each foot section is of approximately the same length and one foot section does not project beyond the heel of the other when the clamp is pressed to clamp the smaller size conduit.

12. A clamp as set forth in claim 11 wherein said deviating cam catch includes a struck leading portion projecting below the plane of the foot and a continuing struck trailing portion projecting above the plane of the foot adapted to catch one of the transversely extending edges of either hole when the pressure is released.

13. A clamp as set forth in claim 12 wherein the trailing portion is bent to curve toward the foot to present a low profile when the clamp catch is secured in either hole.

14. A generally U-shape spring metal conduit clamp comprising spring legs, said legs terminating in foot sections extending generally toward each other in a predetermined spatial relationship, one foot section having a hole therethrough with a transverse linear edge, and the other foot section lying inwardly thereof and terminating in a low profile deviating cam catch extending transversely of the foot, whereby said foot sections may be pressed toward each other by finger pressure at the heel of the foot to secure the catch in the hole against its linear transverse edge upon release of such finger pressure, said clamp being adapted to embrace different size conduit, there being a pair of holes spaced longitudinally of one foot section, each hole having linear edges extending transversely of the foot, the application and then release of finger pressure serving to secure the catch in a selected one of said holes depending on the size of the conduit clamped, and wherein each linear edge of each hole is struck inwardly of the clamp.

* * * * *